No. 701,342. Patented June 3, 1902.
A. T. HOLT.
PROCESS OF MAKING RUBBER TIRES.
(Application filed Oct. 7, 1901.)
(No Model.)
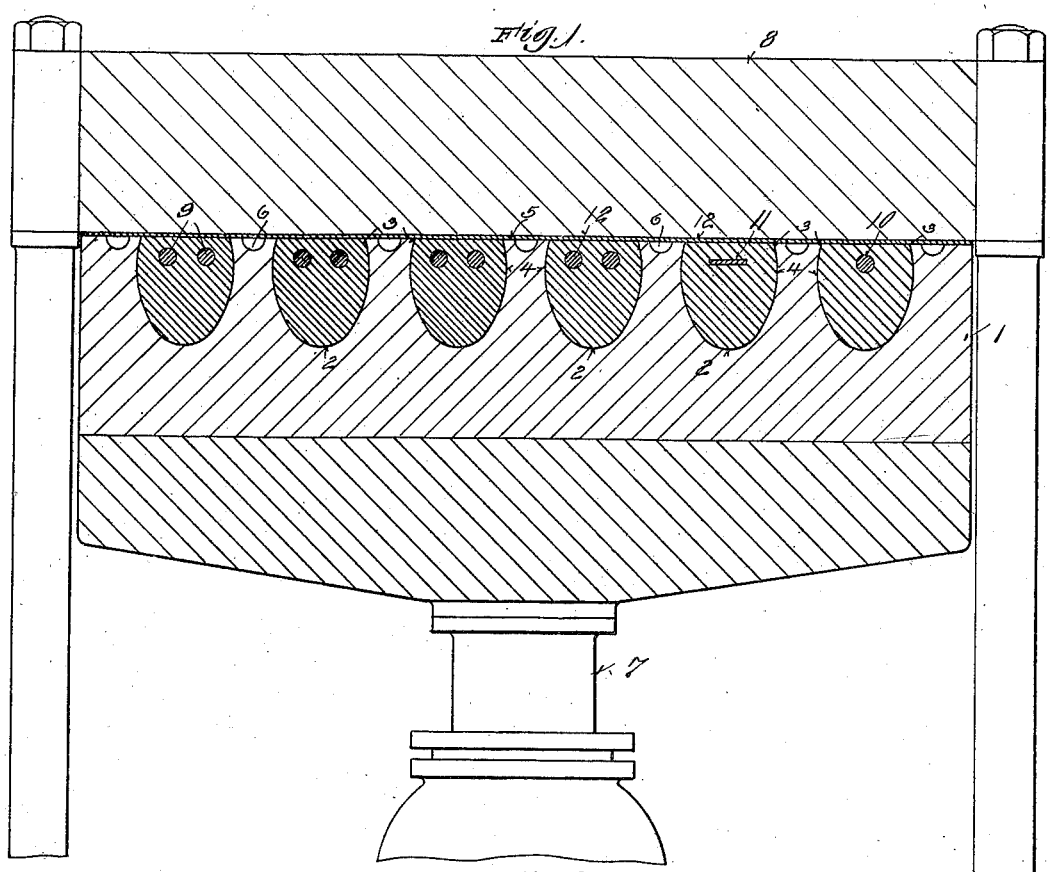
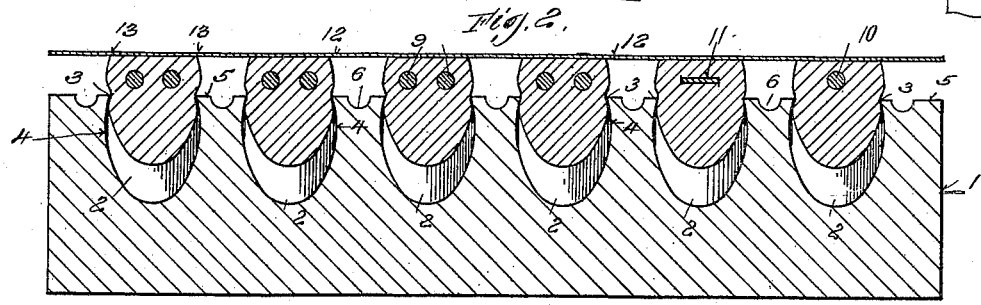
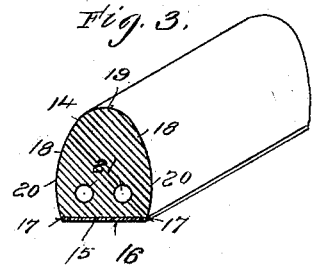
WITNESSES:
INVENTOR.
Albert T. Holt
BY
ATTORNEY.
THE NORRIS PETERS CO., PHOTO-LITHO., WASHINGTON, D. C.

UNITED STATES PATENT OFFICE.

ALBERT T. HOLT, OF SPRINGFIELD, OHIO.

PROCESS OF MAKING RUBBER TIRES.

SPECIFICATION forming part of Letters Patent No. 701,342, dated June 3, 1902.

Application filed October 7, 1901. Serial No. 77,819. (No specimens.)

*To all whom it may concern:*

Be it known that I, ALBERT T. HOLT, a citizen of the United States, residing at Springfield, in the county of Clark and State of Ohio, have invented certain new and useful Improvements in Processes of Making Rubber Tires, of which the following is a specification, reference being had therein to the accompanying drawings.

This invention relates to an improved process of making rubber tires, and has for its object to produce a tire having a flat base and sides, forming with the base a sharp and well-defined angle, the greatest width of the tire being at a point above the base and the tire having perfectly smooth sides without angles, fins, or ridges of rubber.

Heretofore in the making of rubber tires whose greatest width lies between the tread and base such tires have always been made in a two-part mold, each part of which contains a groove or cavity forming a portion of the entire mold-cavity in which the tire is molded, said two parts of the mold meeting at the point of greatest width of the tire, so that after the tire is molded and the two parts of the mold have been separated to permit the removal of the tire it issues from the mold with a well-defined fin or rib of rubber projecting from each side along the lines where the two sections of the mold meet.

It is the object of my present invention to provide a process whereby there may be readily and effectively produced a tire of the character hereinbefore described the sides of which shall be perfectly smooth when the tire issues from the mold; and to these ends my invention consists in the process which I will now proceed to describe and will then particularly point out in the claims.

In the accompanying drawings, Figure 1 is a vertical sectional view of an apparatus employed in carrying out my improved process, the parts thereof being shown in the position which they assume during the molding and vulcanizing of the tires. Fig. 2 is a sectional view of a part of the apparatus in the position which the parts assume during a subsequent period of the process; and Fig. 3 is a detail view, partly in section and partly in perspective, of a tire produced by my process.

In carrying out my improved process I provide a mold having therein one or more mold-cavities of a shape in cross-section exactly corresponding to the cross-section of the tire to be produced. In other words, said mold-cavity is of a depth equal to the height of the tire to be produced, and its mouth or opening is of a width equal to the width of the base of the completed tire, the greatest width of the mold-cavity lying inward from its mouth. The face of the mold is flat and lies in the plane of the mouth of the mold-cavity, and I employ in connection with said mold a suitable plate or platen which fits against the flat face of the mold and closes the mouth of the mold-cavity, with which it lies flush. Suitable means are also employed for either forcing both mold and platen toward each other or forcing either one of the two parts toward the other, and suitable means are also provided for properly heating the contents of the mold to effect vulcanization.

In carrying out the process the mold-cavity is first filled with a suitable rubber compound, and the mold and platen are then brought together and pressure and heat applied until the tire is properly vulcanized. I prefer to place canvas between the mold and platen prior to the pressing and vulcanizing, so that after these operations have been performed the canvas will adhere to the base of the tire and become a portion thereof. After the tire has been vulcanized and the mold and platen have been separated the tire may be removed from the mold by grasping one end thereof and withdrawing it through the mouth of the mold-cavity, the compressibility of the rubber permitting the wider body portion of the tire, which lies inward from the constricted mouth of the mold-cavity, to pass out through said constricted mouth, and thus permit the freeing of the tire from the mold-cavity. Where canvas is vulcanized to the base of the tire, which, as I have already stated, is the method which I prefer to follow, the presence of such canvas adhering to and incorporated in the base of the tire serves to materially aid in pulling the tire out of the mold-cavity. The edges of the canvas are then trimmed, if canvas be employed and such trimming be necessary, and there will thus be produced a tire having a flat base and sides without any fins, ribs, or projections of rubber whatever, the greatest width of the tire being above the base. Moreover, the sides will meet the base at a sharp and well-defined angle, and in case canvas is employed the under side of the base will be covered and protected by a layer of canvas coextensive therewith and adhering thereto firmly.

In the accompanying drawings I have shown an apparatus adapted to carry out my improved process.

In said drawings, 1 indicates the mold, which in the present instance consists of a metal plate having in its face a plurality of mold-cavities 2, which are preferably in the form of grooves extending the length of the mold and having a shape conforming to the shape of the complete tire. The mouth of each mold-cavity, which is indicated at 3, is constricted or of less width than the widest portion of the mold, which is indicated at 4, said widest portion lying inward from the mouth. The face of the mold (indicated at 5) lies in the plane of the mouths of the several mold-cavities, and I prefer to form in said face overflow-grooves 6 to receive any surplus of rubber. The mold is carried by the ram 7 of a suitable press and can thus be forced against a plate or platen 8, having a smooth flat under surface adapted to fit against the face 5 of the mold and close the mouths of the mold-cavities. It will be understood that the apparatus has means for supporting within each mold-cavity one or more cores 9, by means of which corresponding apertures are formed longitudinally through the rubber of which the tires are composed. In Fig. 1 I have shown some of the mold-cavities as provided with two such cores lying side by side and forming two longitudinal apertures through the tire, while at the right of the said figure I have shown a single round core 10 and adjacent thereto a single flat core 11, by means of which corresponding apertures may be formed in the tire. It will be understood, of course, that by the use of suitable cores and a suitable number thereof longitudinal apertures of any desired shape and number may be provided in the tires. The mold-cavities of the mold are filled with a suitable rubber compound, and a sheet of canvas 12 is then laid over the face of the mold. The mold is then brought up against the fixed plate or platen 8, and the contents of the mold-cavities are subjected to heat and pressure, thereby vulcanizing the rubber compounds and causing the canvas to adhere to the bases of the tires. After this operation is completed and the mold and platen are separated the tires may be withdrawn from the mold-cavities by pulling them upward, the body of the rubber being compressed as it passes through the constricted mouth of each mold-cavity, as indicated in Fig. 2. The presence of the canvas, which is now vulcanized to the tire, is of material assistance in removing the tires from the mold, and, as a matter of fact, in practice the removal is effected by grasping the canvas and pulling up on the same, thereby drawing out the tires in the manner indicated. After the removal from the mold the canvas is separated along the lines at the corners of the base, (indicated at 13 in Fig. 2,) and there is thereby produced a tire which is indicated as a whole by the reference-numeral 14 in Fig. 3 and which has a flat base 15, covered by a layer of canvas 16, which is coextensive therewith. This flat base meets the sides 18 of the body of the tire at angles 17, which are sharp and well defined, and the sides of the body diverge and then converge outwardly to a junction with the rounded tread 19, so that the widest portion of the tire, which is indicated at 20, is above the base, the sides of the tire being without any fin or rib of rubber as the tire comes from the mold. Such fins or ribs are unsightly and objectionable, and, so far as I am aware, have always been present in rubber tires of the type to which my invention relates, wherein the point of greatest width is above the base. Moreover, by reason of the sharp and well-defined angles where the base meets the sides of the tire the tire is better adapted to fit within the channeled rim usually employed in conjunction with such tires and seats itself more firmly therein. The completed tire will of course have one or more suitably-formed apertures 21 therein for the reception of any of the retaining devices usually employed in connection with such tires.

It is obvious that various modifications in the process employed and in the structure of the tire may be made without departing from the principle of my invention and that apparatus other than that illustrated may be employed in the carrying out of the process, and I therefore do not wish to be understood as limiting myself to the precise details hereinbefore described.

Having thus fully described my invention, what I claim as new, and desire to secure by Letters Patent, is—

1. The herein-described process of making rubber tires, which consists in subjecting the rubber to heat and pressure in a mold-cavity having the shape of the complete tire, the widest point thereof lying inward from a relatively constricted mouth, and withdrawing the vulcanized tire through said constricted mouth by compressing the wider portions of the body thereof, substantially as described.

2. The herein-described process of making rubber tires, which consists in subjecting the rubber to heat and pressure in a mold-cavity having the shape of the complete tire, the widest point thereof lying inward from a relatively constricted mouth, the base of the tire being coincident with said mouth and the pressure being applied to said mouth, and withdrawing the vulcanized tire through said constricted mouth by compressing the wider portions of the body thereof, the withdrawal being effected successively from one end of the tire to the other, substantially as described.

3. The herein-described process of making rubber tires, which consists in subjecting the rubber to heat and pressure in a mold-cavity having the shape of the complete tire, the widest point thereof lying inward from a relatively constricted mouth, the pressure being applied at the mouth of the mold through an interposed sheet or strip of canvas, and withdrawing the vulcanized tire along with the canvas through said constricted mouth by compressing the wider portions of the body thereof, substantially as described.

4. The herein-described process of making rubber tires, which consists in providing a mold having a plurality of mold-cavities, each having the shape of a complete tire and having its widest point lying inward from a relatively constricted mouth, subjecting the rubber to heat and pressure between said mold and a flat plate or platen, a sheet of canvas being interposed between the mold and platen, and the pressure being applied to the mouths of the mold-cavities, withdrawing the vulcanized tires through the constricted mouths of the mold-cavities by pulling on the canvas and thereby compressing the wider portions of the bodies of the tires to permit them to pass through said mouths, and then severing the canvas along the edges of the base of each tire, substantially as described.

In testimony whereof I affix my signature in presence of two witnesses.

ALBERT T. HOLT.

Witnesses:
. E. O. HAGAN,
IRVINE MILLER.